United States Patent
Kim et al.

(10) Patent No.: US 9,672,338 B1
(45) Date of Patent: Jun. 6, 2017

(54) MANAGING APPLICATIONS ACROSS MULTIPLE MANAGEMENT DOMAINS

(71) Applicant: MOBILE IRON, INC., Mountain View, CA (US)

(72) Inventors: Mansu Kim, Cupertino, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 30 days.

(21) Appl. No.: 14/793,022

(22) Filed: Jul. 7, 2015

Related U.S. Application Data

(60) Provisional application No. 62/021,615, filed on Jul. 7, 2014.

(51) Int. Cl.
*G06F 17/00* (2006.01)
*G06F 21/31* (2013.01)
*H04L 29/06* (2006.01)
*G06F 9/445* (2006.01)
*G06F 21/62* (2013.01)

(52) U.S. Cl.
CPC ............ *G06F 21/31* (2013.01); *G06F 8/61* (2013.01); *G06F 21/6218* (2013.01); *H04L 63/20* (2013.01)

(58) Field of Classification Search
CPC ........ G06F 21/31; G06F 8/61; G06F 21/6218; H04L 63/20
USPC ............................................................ 726/1
See application file for complete search history.

(56) References Cited

U.S. PATENT DOCUMENTS 9,075,583 B1 * 7/2015 Cutter ................... G06F 8/20
2014/0337528 A1 * 11/2014 Barton .................. H04L 63/10
709/225

* cited by examiner

*Primary Examiner* — Mohammad W Reza
(74) *Attorney, Agent, or Firm* — Van Pelt, Yi & James LLP

(57) ABSTRACT

Techniques to manage applications, such as mobile apps, across multiple management domains are disclosed. In various embodiments, a set of one or more application management policies to be enforced with respect to a mobile device is received from a management entity to which a scope of authority to manage applications with respect to the mobile device has been delegated. A management agent on the mobile device is used to enforce the one or more application management policies with respect to applications and application data that are within the scope of authority delegated to the management entity.

16 Claims, 12 Drawing Sheets

MANAGING APPLICATIONS ACROSS MULTIPLE MANAGEMENT DOMAINS

CROSS REFERENCE TO OTHER APPLICATIONS

This application claims priority to U.S. Provisional Patent Application No. 62/021,615 entitled MANAGING APPLICATIONS WITH A BYOD MANAGEMENT BROKER filed Jul. 7, 2014 which is incorporated herein by reference for all purposes.

BACKGROUND OF THE INVENTION

In a "bring your own device" (BYOD) environment, employees may use their personal devices (e.g., mobile phone, tablet, laptop, etc.) for work purposes (e.g., enterprise purposes). When a device is used in a BYOD architecture, one or more entities (e.g., one or more employers) may need to manage the device to secure the contents and/or applications used for work purposes. When a device is managed by such an entity, even though the device is owned by the employee, the employee may be required to delegate certain aspects of control of the device and/or privacy to the entity.

In certain cases, complexity is introduced when the employee's device is shared with family members and/or when the employee works for multiple different companies. Some device platforms (e.g., iOS) may only allow one device management server to manage a device. However, multiple independent entities having an interest in managing data and/or other aspects of a device. The respective entity may need to manage different apps on the device and/or to manage independently different sets of app data on the device.

BRIEF DESCRIPTION OF THE DRAWINGS

Various embodiments of the invention are disclosed in the following detailed description and the accompanying drawings.

DETAILED DESCRIPTION

Figure 1A:
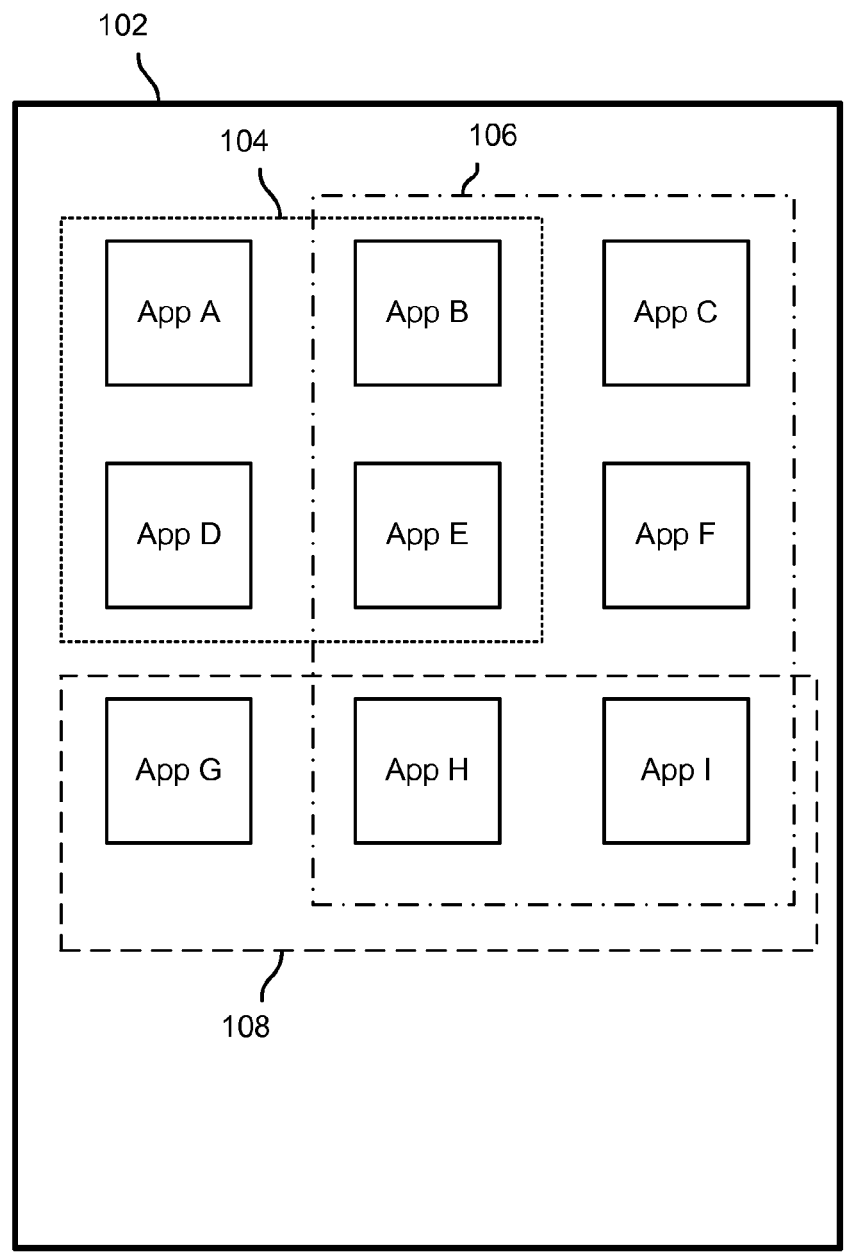
FIG. 1A is a block diagram illustrating an embodiment of a managed device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to manage applications and associated data, e.g., mobile apps and app data on a mobile device, across management/administrative domains, each having apps and/or app data on the device, are disclosed. In various embodiments, a device owner or other super user delegates authority within a defined scope to each of one or more independent device management entities. Each entity is given access to and authority over apps and/or app data that is owned by or otherwise subject to the control of the entity, without exposing the data to any other entities to which authority over other apps/data owned or controlled by those entities may have been delegated.

According to various embodiments, the techniques disclosed herein may provide one or more of the following management features:

Delegation of application install/uninstall (e.g., to an enterprise) without conflicting with other existing apps.

Configuring apps with multiple enterprise-specific configurations.

Configuring containers (e.g., app wrapping and/or enterprise containers).

In various embodiments, a device configured using the approaches discussed herein may allow multiple instances of apps across different identities (e.g., user identities, company identities, etc.). An enterprise may maintain security of their apps when a device is used for multiple enterprises. In some embodiments, a user's personal apps may not be affected by a company's policies.

FIG. 1A is a block diagram illustrating an embodiment of a managed device. In the example shown, mobile device 102 has installed thereon a first set of applications 104 associated with a first enterprise; a second set of applications 106 associated with a second enterprise; and a third set of applications 108 that are used for personal use of the owner of device 102. An enterprise or other entity to which management authority of apps and/or app data is to be delegated may be an employer, an app vendor, or any other entity that may have an interest in managing one or more apps on a mobile device and to which an owner (or other super user) of the mobile device may be willing to delegate authority.

The respective sets of applications are overlapping, in the example shown in FIG. 1A. Specifically, App B and App E are included in the first set of applications 104 and the second set of applications 106. The first enterprise and the second enterprise each may require or permit use of apps in its respective set of applications 104, 106, and each may require that the apps as used in connection with work for that enterprise and/or in connection with data owned or otherwise under the control of that enterprise must be subject to a degree of control (management) by that enterprise. For apps that are managed by both entities, e.g., App B and App E, each entity may require that its data be accessible only subject to conditions specified by a policy of that enterprise. For example, each may require that its data only be accessible using such apps to a user who has logged in user a user credential associated with that enterprise.

Referring further to FIG. 1A, in this example App H and App I are included in set 108, associated with personal use, but also in set 106, associated with the second enterprise. In various embodiments, the second enterprise may allow such apps to be used for both enterprise and personal use, but may require that enterprise app data be accessible only to a user who has logged in user a user credential associated with that enterprise. Conversely, the device owner may not want personal data to be accessible by the enterprise.

According to various embodiments, even if there are multiple companies and/or app vendors delegated to provide app management for a device, a device owner may be provided a consolidated view of apps that have been assigned to a device, such as the view shown in FIG. 1A. In some embodiments, a given user may be shown a view that displays only a subset of apps available for use by that user. For example, a device may be associated with multiple users. And a user associated with companies A, B, and C may be able to see apps from companies A, B, and C but not apps from company D. Similarly, another user associated with companies A and D may be able to see apps associated with company A and D and not companies B and C.

In various embodiments, multiple categories of apps may be managed using the techniques disclosed herein:
- Applications managed by a single company (e.g., Apps A and D in FIG. 1A). In this case, each company may have full management capability without conflicting with other companies' settings and/or user's personal settings.
- Applications including personal data and company data (e.g., Apps H and I). In the example shown, the second enterprise can only manage that portion of app data for Apps H and I that is company data (e.g., not user's personal data). In various embodiments, an entity may alter the lifecycle (e.g., install, delete, and/or update the app) of an app also used for personal use only with the user's permission.
- Applications including data from multiple companies but no personal data (e.g., Apps B and E in FIG. 1A). In the example shown in FIG. 1A, Apps B and E have no personal data but the app binary is shared between the first enterprise and the second enterprise. Each entity, in this case, may have limited app lifecycle management (e.g., can install, delete, and/or update the app only with other company's and/or user's permission).
- Applications include personal data and multiple companies' data. In some embodiments, each company's lifecycle management permissions may be limited by other company permissions and/or user permissions.

Figure 1B:
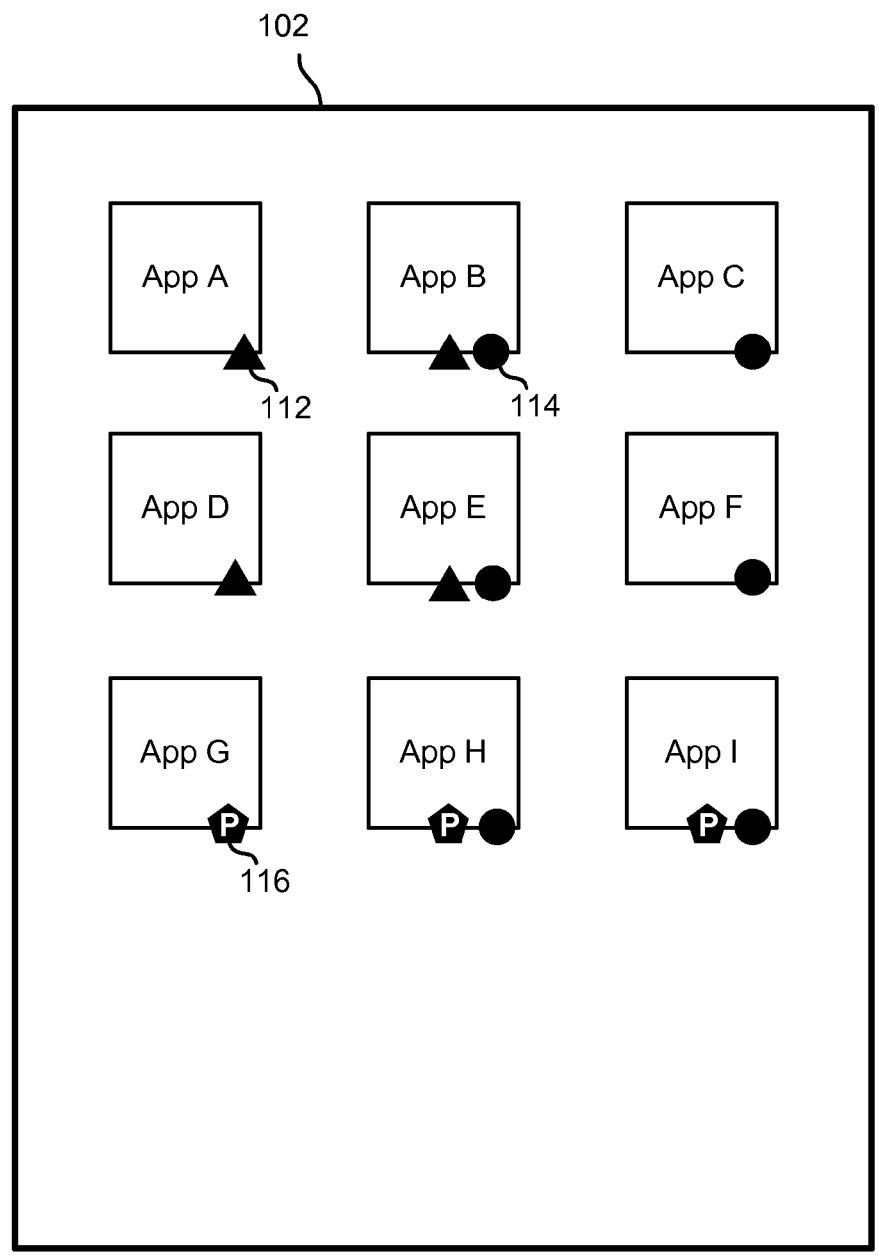
FIG. 1B is a block diagram illustrating an embodiment of a managed device.

FIG. 1B is a block diagram illustrating an embodiment of a managed device. In the example shown, each app installed on device 102, or in some embodiments in the view currently being display, which may include only those apps associated with a current user, is represented by an app icon that includes a badge or other variation/addition that indicates one or more management domains to which that app is subject. For example, referring both to FIG. 1A and FIG. 1B, apps shown in FIG. 1A to be included in the first set of applications 104, subject to management by the first enterprise, are identified by the addition of a small triangle (or other icon or logo) 112 in the lower right corner. A company logo, color, or other visual indication may be used in various embodiments. Likewise, apps shown in FIG. 1A to be included in the second set of applications 106, subject to management by the second enterprise, are identified by the addition of a small circle (or other icon or logo) 114 in the lower right corner. For apps subject to management by both enterprises, in this example App B and App E, both icons 112 and 114 are shown. Finally, in this example, apps available for personal use and/or subject to management by the device owner with respect to the owner's personal app data are indicated by a pentagon with a letter "P" 116. In various embodiments, icons or other visual indications such as those shown in FIG. 1B may be provided to apprise the user quickly of which apps are subject to management by which entities.

Figure 2:
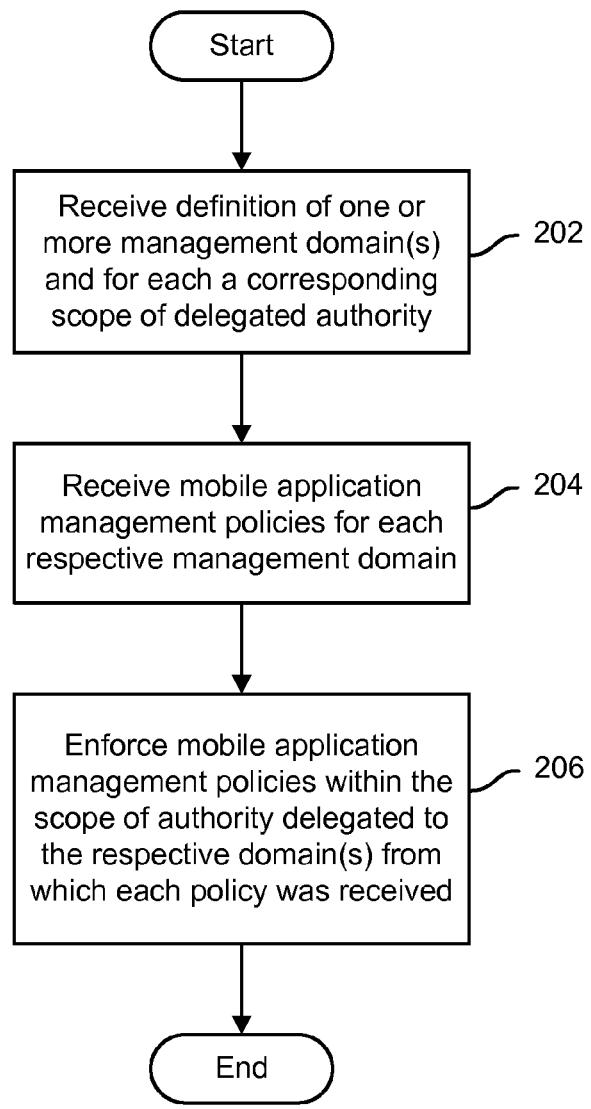
FIG. 2 is a flow chart illustrating an embodiment of a process to provide delegated device management.

FIG. 2 is a flow chart illustrating an embodiment of a process to provide delegated device management. In various embodiments, the process of FIG. 2 may be performed by a device management broker, agent, or other module running on a managed device and/or by a device management broker system external to the device and configured to provide brokered management by multiple management entities/domains each with respect to a delegate set of aspects of the device, such as a specific set of apps and/or associated app data. In the example shown, a definition of one or more management domains, each associated with a specified management entity, and for each domain a corresponding scope of management authority with respect to the device is received (202). For example, an owner or other user may use an administrative user interface to define a new (added) management domain and to indicate one or more apps and/or app data over which a management entity/authority associated with that management domain is delegated management authority. In some embodiments, conflict resolution and/or precedence rules may be indicated. The management entity to which authority is delegate may comprise and/or be associated with a mobile device management (MDM) server, an application vendor/server, or other system, node, or entity. The scope of authority may be with respect to a specified list of apps and/or over apps downloaded from and/or otherwise subject to the supervision of the management entity.

Referring further to FIG. 2, mobile (or other) application management policies are received for each respective management domain that has been defined (204). For example, an on device or external management broker may receive application management and/or other management policies from each management domain to which authority has been delegated. The respective policies received from each management domain are enforced within the respective scope of authority delegated to each (206).

In some embodiments, a management broker configured to perform the process of FIG. 2 may be configured to broker competing policies, as disclosed herein, and may act as the one (consolidated) management authority that the mobile device is configured to recognize. For example, the management broker in various embodiments may be identified to a native mobile device management (MDM) agent and/or functionality on the device as the one management authority authorized to manage the device via the native MDM agent.

Figure 3:
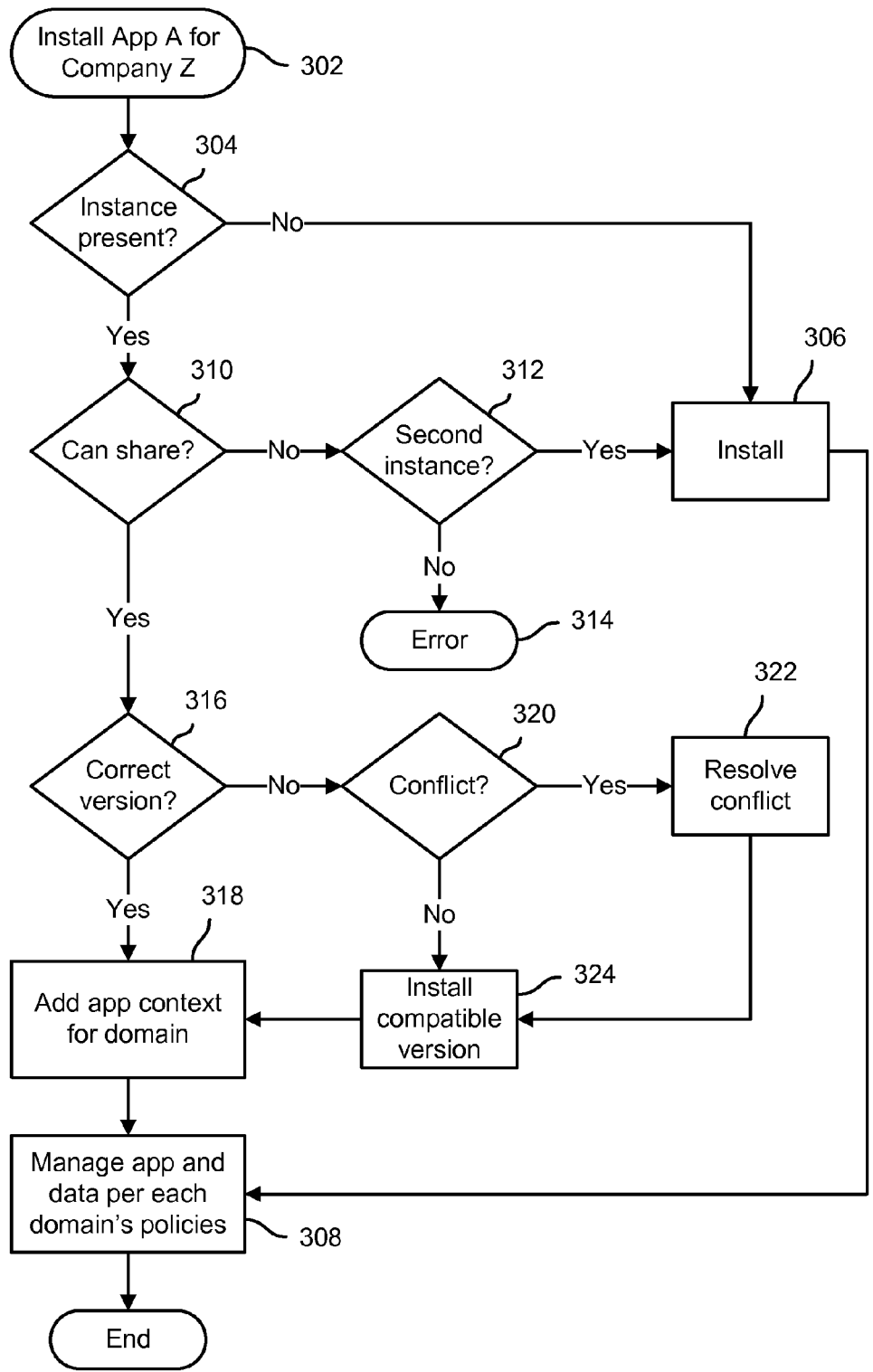
FIG. 3 is a flow chart illustrating an embodiment of a process to manage installation of a mobile app.

FIG. 3 is a flow chart illustrating an embodiment of a process to manage installation of a mobile app. In various embodiments, the process of FIG. 3 may be performed by a management broker or other entity installed on a mobile device or on a system external to the mobile device. In the example shown, an indication is received from a company Z to install an app A on a mobile (or other) device (302). For example, a policy of company Z may indicate the app A is required to be installed on the device. Or, a user of the device may have selected the app for installation, e.g., in the context of an enterprise app store or other interface. It is determined whether an instance of the app is already present on the device (304). For example, another company may have required/requested previously that the same app be installed. Or, the user-owner may have installed the app for personal use. If no instance of the app is present, the app is installed as requested (306), and the app is added to a set of apps under management by the requesting company Z and is managed on the device in a manner that is consistent with the policies set by company Z (308).

If an instance of the app is determined to be present already (304), it is determined whether the existing instance can be used by and/or shared with company Z (310). For some apps, the app may not include binary (e.g., a library) required to support shared use of the app under management by separate management domains. For example, a library may be provided/installed, e.g., via a software development kit (SDK), to re-direct to replacement functions app calls to the device file system. Such redirection may enable separate sets of app data to be maintained for each management domain, as discuss more fully below. If the instance of the app that is already present on the device cannot be shared (304, 310), it is determined whether a second instance of the app may be installed (312). For example, it may be necessary to be able to use a variant on the app name to be able to install another instance, which in some cases may require that the app being re-packaged or otherwise modified. If a second instance of the app cannot be installed (312) an error (314) is returned to prompt a human user to resolve the situation. If a second instance can be installed (312), however, then the second instance is installed (306) and placed under management by company Z (308).

If an instance of the app is present and can be shared (304, 310), it is determined whether the installed version is the correct version (316), i.e., the version required and/or a version permitted by company Z. If the version is a correct version (316), an app context is defined and added for the requesting company, company Z in this example (318). For example, the app and/or an associated management agent may be configured to store separately, in an area only accessible to and under the management of company Z, app data that is associated with company Z. For example, if the app is accessed in a context associated with company Z, e.g., the user has logged in to a secure zone or session associated with company Z, then app data stored in an area associated with company Z may be used.

If the installed instance is not a correct version (316), it is determined whether there are conflicting policies that need to be resolved (320). For example, a company X with which the previously-installed instance of the App A is associated may have specified a specific version, or simply that a version more recent than a specified version, be used. Company Z may require or specify a different version, range of versions, or related requirement.

In some embodiments, when app version conflicts arise (320), the conflicts may be resolved (322). An app version conflict can be detected by management system comparing already installed app version with the to-be installed app version. In various embodiments, conflicts can be resolved in multiple ways including one or more of the following:

1) Install latest known compatible versions between companies. This may require application vendors and/or companies to determine (e.g., mark an application) indicating whether they allow fall back (e.g., rolling back) to a compatible version or not.
2) Install multiple instance of an app with different versions. This may require applications to be repackaged with different names. Use of this approach may be limited with some public app store apps if, for example, installation of multiple application instances is not allowed (e.g., contractually) by the public app store, app developers, and/or other parties.

In some embodiments, while resolving the app version conflict, a user may be notified if changes (e.g., resulting from conflict resolution) are irreversible. In some embodiments, a version conflict resolution backup of an app's data may be generated to support rollback to a previous version if a new version fails and/or a user wants to roll back.

Once version conflicts, if any, have been resolved (320, 322), or if there was no conflict (320), i.e., different versions required by different companies are determined to be able to be installed, then a compatible version is installed for use by one or both of the companies (324), an app context is defined/added for the requesting company Z (318), and the app and app data are managed per each applicable management domain's applicable policies (308).

Figure 4:
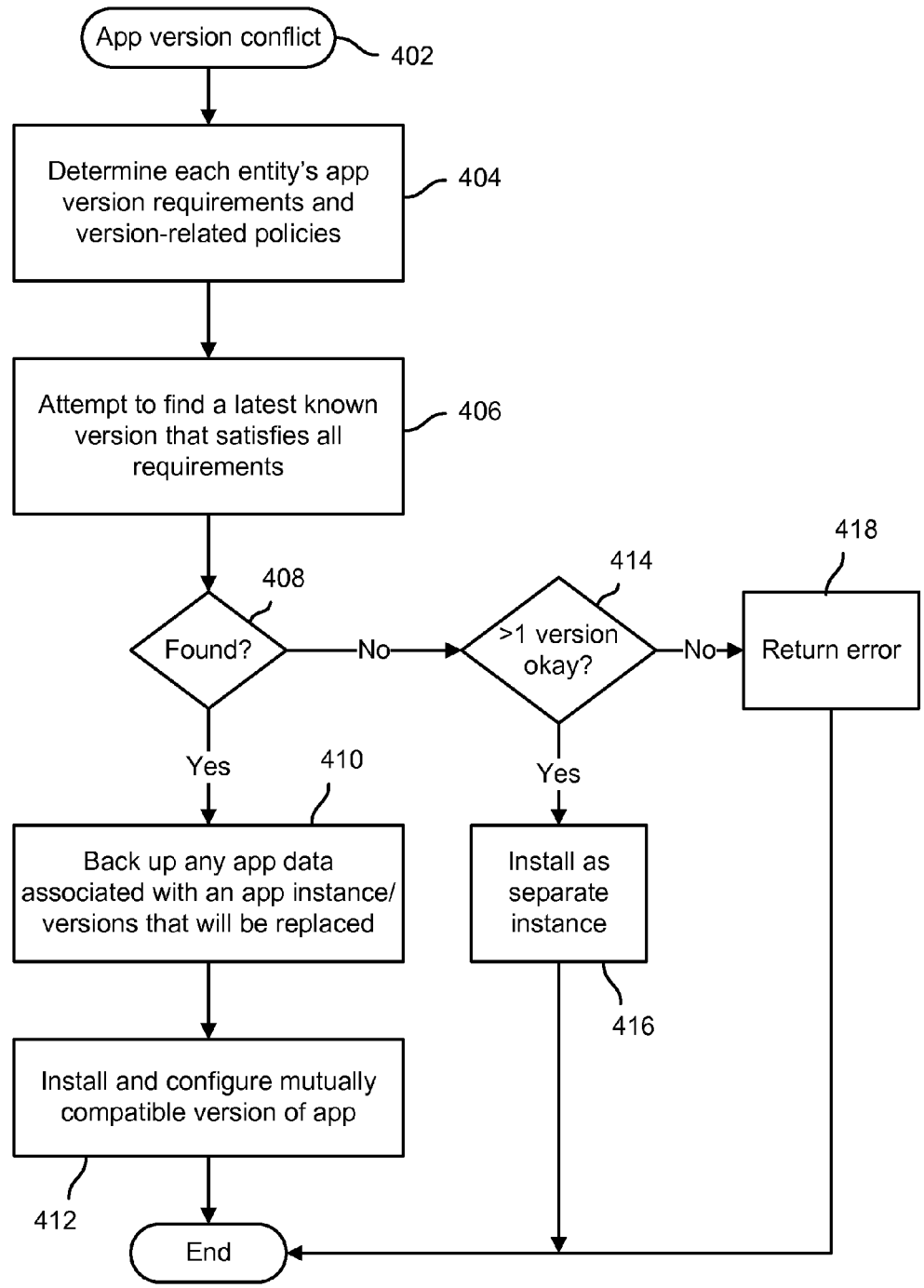
FIG. 4 is a flow chart illustrating an embodiment of a process to resolve conflicts among app installation requirements.

FIG. 4 is a flow chart illustrating an embodiment of a process to resolve conflicts among app installation requirements. In various embodiments, step 322 of FIG. 3 may be implemented at least in part by using the process of FIG. 4. In the example shown, when a conflict between app versions is detected (402), each management entity's app version-related requirements are determined (404). An attempt is made to find a latest known version that satisfies all requirements (406). If a version that satisfies all requirements is found (408), app data associated with any prior version that will be replaced by the found version is backed up (410) and the found version is installed and configured per applicable policies (412). In some embodiments, a notification may be sent to management entities whose data may be affected by replacing an installed version with a new version.

If a mutually compatible version is not found (408), it is determined whether more than one version of the app may be installed on the device at the same time (414). If not, an error is returned (418). If so, the required version(s) is/are installed, in addition to the previously-installed version(s) (416), and the process ends.

Figure 5:
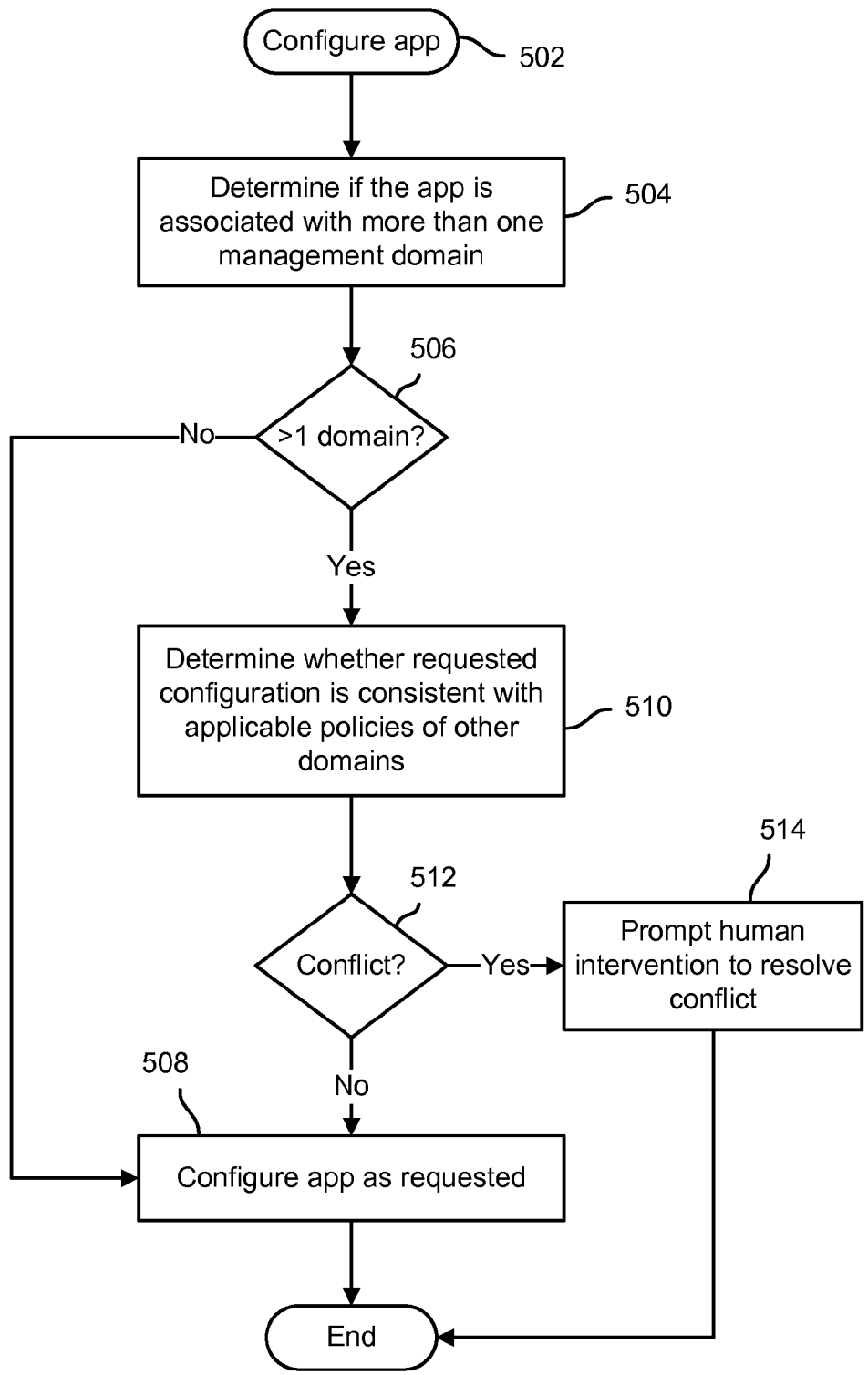
FIG. 5 is a flow chart illustrating an embodiment of a process to configure an app on a managed device.

FIG. 5 is a flow chart illustrating an embodiment of a process to configure an app on a managed device. In various embodiments, the process of FIG. 3 may be performed by a management broker or other entity installed on a mobile device or on a system external to the mobile device, and/or by a native or other management agent on the device, e.g., under the control of a management broker. In the example shown, upon receiving a request to configure an app (502) it is determined if the app is associated with more than one management domain (504). If not, the app is configured as requested (508). However, if the app is under management by more than one management domain (506), it is determined whether the requested configuration is consistent with or instead has one or more conflicts with the applicable policies of the other management domain(s) that share management authority over the app (510). If there is determined to be a conflict (512), a response is returned to prompt a human user to resolve the conflict (514). If there is not a conflict (512), the app is configured as requested (508).

Figure 6:
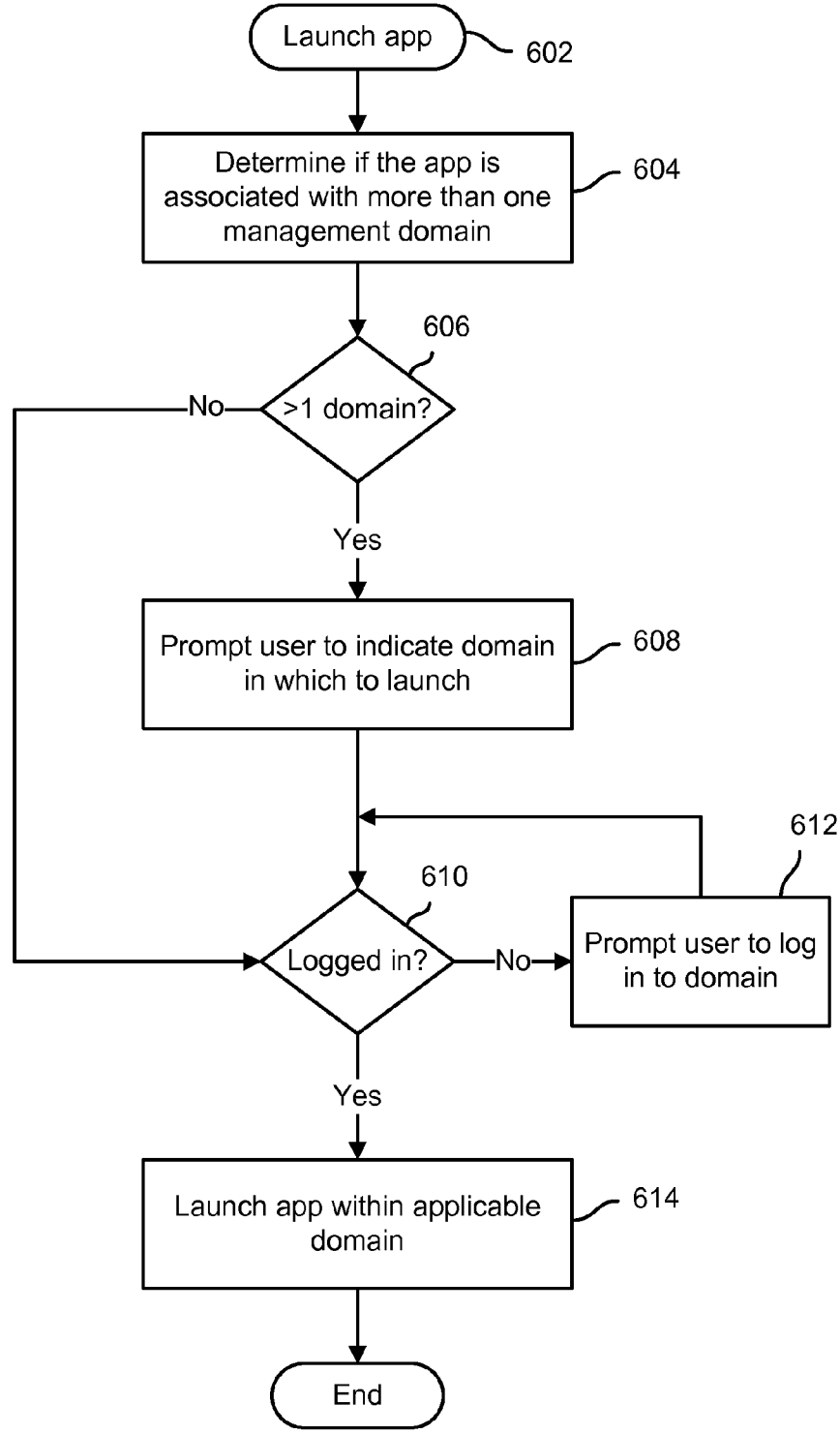
FIG. 6 is a flow chart illustrating an embodiment of a process to launch an app on a managed device.

FIG. 6 is a flow chart illustrating an embodiment of a process to launch an app on a managed device. In various embodiments, the process of FIG. 3 may be performed by a management broker or other entity installed on a mobile device or on a system external to the mobile device, and/or by a native or other management agent on the device, e.g., under the control of a management broker. In the example shown, when a managed app is launched (602), it is determined whether the app is associated with more than one management domain (604). If so (606), the user is prompted to indicate the management domain context in which the user wants to open the app (608). For example, a list of applicable management domains could be presented, or a question, such as, "Do you want to open this app in relation to Company Z or your Personal Use?" In some embodiments, the context may be inferred from other information. For example, if the user has logged in to a secure "zone" associated with a given management domain, it may be inferred that the app is to be opened in that context.

Referring further to FIG. 6, once the user has indicated a management domain/context, or if one is inferred (608), or if there is only one applicable management domain (606), it is determined whether the user is logged in to a secure "zone" associated with that management domain (610). If not, the user is prompted to log in (612). Once the user has logged in (610), the app is launched within the applicable management domain/context (614).

Figure 7:
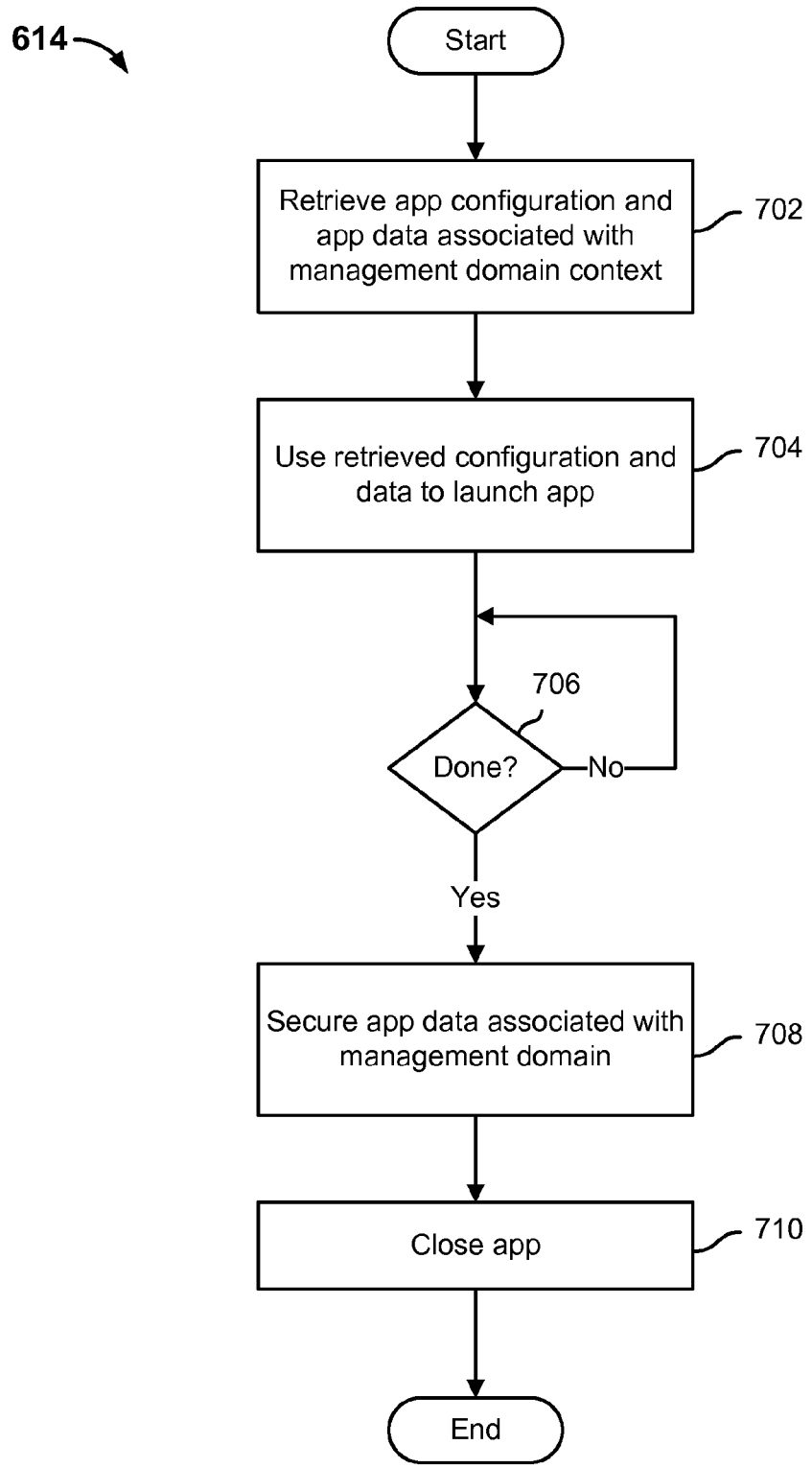
FIG. 7 is a flow chart illustrating an embodiment of a process to launch an app on a managed device.

FIG. 7 is a flow chart illustrating an embodiment of a process to launch an app on a managed device. In various embodiments, the process of FIG. 3 may be performed by a management broker or other entity installed on a mobile device or on a system external to the mobile device, and/or by a native or other management agent on the device, e.g., under the control of a management broker. In some embodiments, step 614 of FIG. 6 may be implemented using the process of FIG. 7. In the example shown, the process of launching an app in the context of a particular management domain, e.g., with respect to a particular enterprise, personal use, etc., begins with retrieval of app configuration and app data associated with that management domain (702). For example, app file system calls may be redirected to a data set associated with that management domain. The retrieved app configuration and app data are used to launch the app (704). The user uses the app until done (706), e.g., the user closes the app, at which time app data associated with the management domain/context in which the app was launched is secured (e.g., saved, encrypted, and/or app no longer having access currently) (708) and the app is closed (710).

Figure 8:
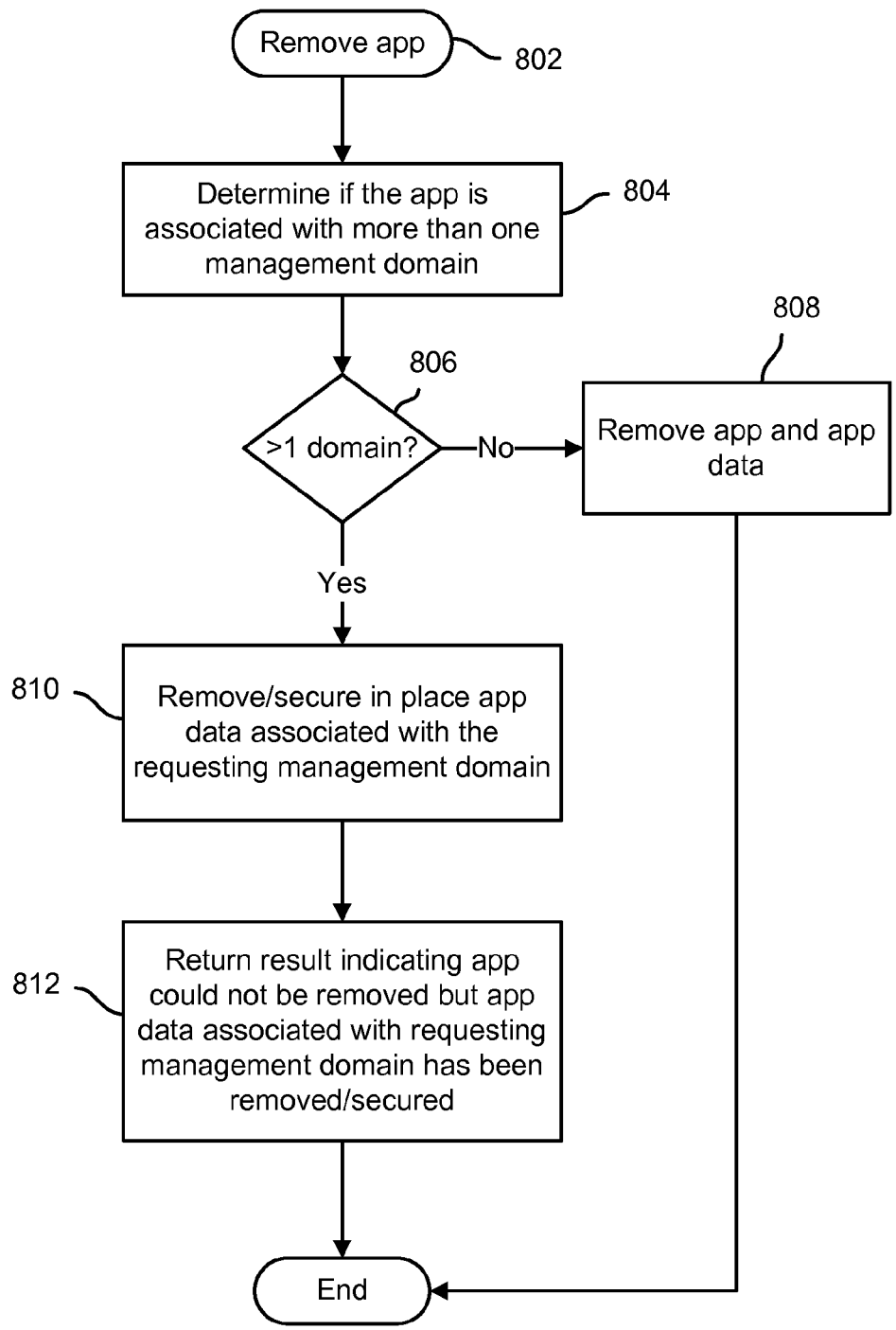
FIG. 8 is a flow chart illustrating an embodiment of a process to respond to a request to remove an app from a managed device.

FIG. 8 is a flow chart illustrating an embodiment of a process to respond to a request to remove an app from a managed device. In various embodiments, the process of FIG. 3 may be performed by a management broker or other entity installed on a mobile device or on a system external to the mobile device, and/or by a native or other management agent on the device, e.g., under the control of a management broker. In the example shown, when an indication to remove an app is received (802), e.g., a managing entity's lifecycle or other policy may indicate the app should be removed, it is determined whether the app is associated with more than one management domain (804). If not, the app and associated app data are removed (808), and the process ends. If more than one management domain is associated with the app (806) and at least one other management domain still expects the app to be present, then the app data associated with the management domain with respect to which the indication to remove the app has been received is removed (e.g., deleted) and/or secured as stored on the device (e.g., encrypted, encrypted with the key removed from the device, encrypted with the key discarded) (810) and a result is returned that informs the management domain that indicated the app was to be removed that the app could not be removed but app data of the management domain has been removed/secured, as applicable (812).

In various embodiments, a process of managing applications may include one or more of the following steps:
1) When a company's app lifecycle management is limited (e.g., not enforced, or enforced in part or in other than a specified way), it will be notified.
   a. For example, detection of app lifecycle management limitation may occur either at a device app management (e.g. Android platform), MDM proxy component (e.g. iOS platform), and/or other node.
   b. An MDM proxy component may, for example, notify the company that pushed the app (e.g., to the device).
2) When a company's app lifecycle management is limited, an MDM system and/or another node may query/invoke a module on the device, e.g., an agent, broker, or other module, which may an allow app's content to be separately managed across multiple companies.
   a. After detection of app life cycle management changes, a company's app lifecycle management system (e.g., company MDM) can command MDM proxy/broker to limit access of a service.
3) In certain cases, a company may have full rights to remove data from the apps and/or device. However, an example exception may include applications with personally-owned and/or personally-sourced content. Other example exceptions may include content owned and/or sourced by another company.
   a. For example, if an app should not work with (e.g., integrate with) certain types of apps (e.g., a fake GPS app, apps from competitors, etc.) contractually, a company's app lifecycle management system (e.g., a company's MDM) can command MDM proxy/broker to remove the app and/or the app's content.

In various embodiments, a management proxy/broker provides application management and a device-level application management framework. In this framework, companies can manage shared apps on shared devices without breaching data security and/or creating management conflicts.

Figure 9:
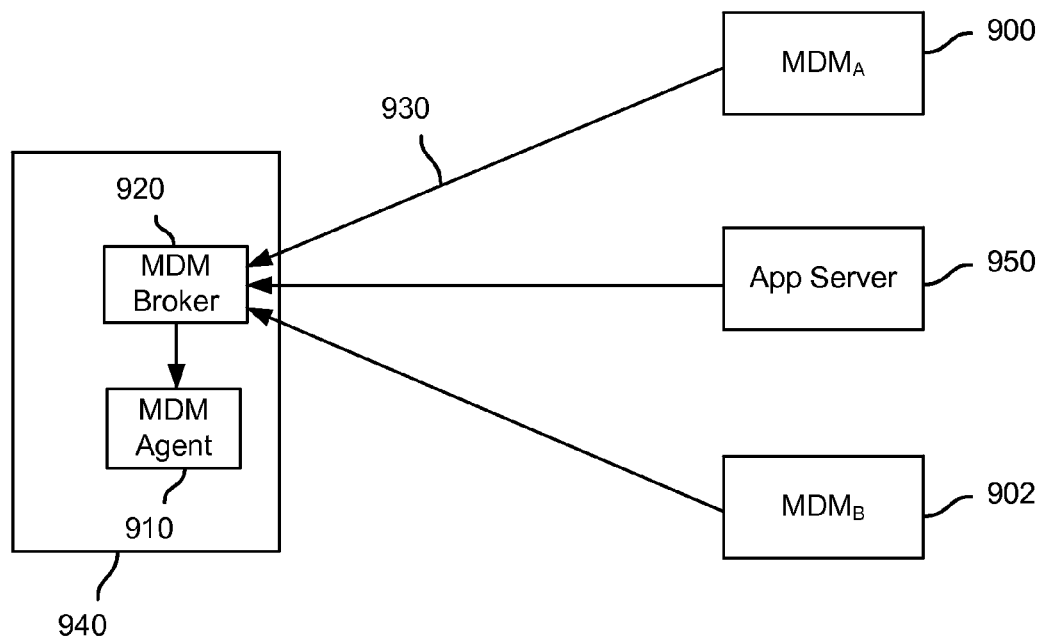
FIG. 9 is a block diagram illustrating an embodiment of a managed device.

FIG. 9 is a block diagram illustrating an embodiment of a managed device. In the example shown, MDM broker 920, sometimes referred to herein as a management proxy agent or management broker, comprises software code, such as a mobile app, running on mobile device 940. The on device MDM broker 920 in this example provides MDM control via a native or other MDM agent 910 on the device. In various embodiments, device MDM agent 910 is configured to trust and take direction from MDM broker 920. In various embodiments, MDM broker 920 includes software code configured to display an interactive user interface, not shown in FIG. 9, to enable a user of device 940 to configure MDM broker 920 to allow one or more remote MDM entities, such as third party MDM servers 900 and 902 and/or application server 950, in this example, to participate in the management of device 940.

While in various embodiments described herein the term "mobile device management" or "MDM" may be used to refer to a management proxy such as MDM broker 920 in the example shown in FIG. 9, techniques disclosed herein may be applied in the context of any management agent or node, e.g., a management server.

According to various embodiments, a device management server 900 (e.g., MDM Server) may be associated with, for example, an enterprise, consumer, and/or other entity. For example, each of multiple companies can have a different type of MDM server 900. A BYOD device 940 (e.g., mobile phone, tablet, iPhone, iPad, etc.) may include a device management agent 910 (e.g., MDM agent). Depending, for example, on an operating system (OS) associated with the device 940, the agent 910 may be embedded to the OS (e.g., iOS, Windows phone), may be an app with device management permission (e.g., Android), and/or may otherwise be associated with the device 940.

In the example shown, a management proxy protocol 930 may allow device management server 900 to communicate with management proxy agent (broker) 920. An application server 950 may send device management commands and/or other information to the BYOD device 940.

In various embodiments, a device owner (e.g., an employee) may configure the management proxy agent (broker) 920 on a BYOD device 940 to be managed by multiple device management servers 900, application servers 950, and/or other nodes. A management proxy agent (broker) 920 may maintain configurations for a list of trusted device management servers 900, authorize device management functions/information, and/or perform other operations.

In various embodiments, a device owner or other super user may configure the MDM broker 920, e.g., via an administrative user interface, to delegate to management domains associated with MDM servers such as 900, 902, and/or app servers such as 950 authority to manage device 940 with respect to apps and/or app data, as disclosed herein. In various embodiments, one or more of the processes of FIG. 2 through 8, inclusive, may be performed in whole or in part by an on-device MDM broker such as MDM broker 920 of FIG. 9, alone or in connection with an MDM agent such as MDM agent 910.

In various embodiments, when a device management server 900 requires device information, the management proxy agent (broker) 920 may filter the information and send it to the device management server 900. Information may be filtered, for example, to limit access to data owned by that management domain. In some cases, depending on the information disclosure policy, the management proxy agent (broker) 920 may report filtered information so the device management server 900 may, for example, decide what to do for missing information. In various embodiments, application server 950 can interact with management proxy agent (broker) 920 to manage a BYOD device 940, e.g., to manage an app and/or app data associated with the application server 950.

Figure 10:
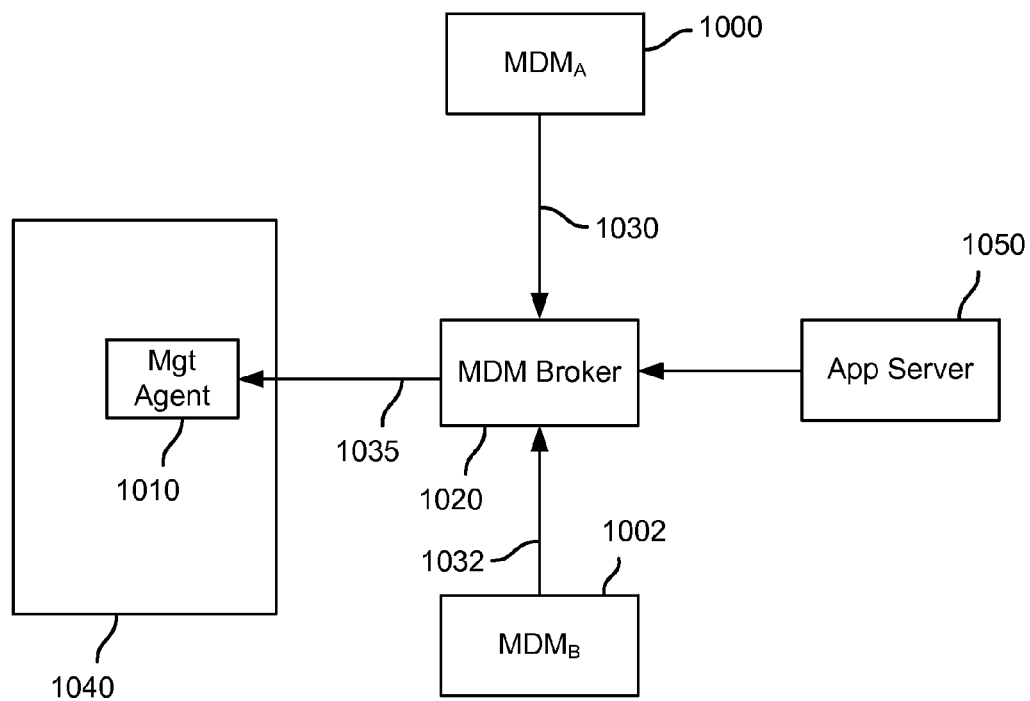
FIG. 10 is a block diagram illustrating an embodiment of a mobile device management broker system.

FIG. 10 is a block diagram illustrating an embodiment of a mobile device management broker system. In the example shown, a management agent 1010 on a device 1040 is configured to be managed by a mobile device management (MDM) broker 1020. In various embodiments, device 1040 may be connected to MDM proxy system 1020, which may be used to provide brokered management of many devices. The MDM proxy system 1020 may, for example, provide application management as disclosed herein across enterprise-associated apps and private apps.

In various embodiments, device management agent 1010 may be included on a BYOD device 1040 (e.g., mobile phone, tablet, iPhone, iPad, etc.). In various embodiments, a type of management agent 1010 may depend on, for example, a device operating system (OS). For example, the agent 1010 may, for example, be embedded in the device OS (e.g., iOS, Windows phone), an application with device management permission (e.g., Android), and/or any other type of management agent 1010.

According to various embodiments, a cloud or other MDM broker 1020 may receive management commands from the device management servers 1000, 1002 or application servers 1050 to which management authority has been delegated. The cloud MDM broker 1020 may, for example, pass the management commands to the device management agent 1010 (e.g., after authentication and/or authorization). The cloud MDM broker 1020 may also process privacy filtering and/or information encryption before sending device information from the device management agent 1010 to the device management server 1000, 1002, 1050.

In various embodiments, the MDM broker may be configured to receive from each management domain (e.g., 1000, 1002, 1050), via a communication channel and/or management protocol (e.g., 1030, 1032) a set of policies or other configuration information related to the management of apps and/or app data associated with that management domain. MDM broker 1020 may be configured to use a communication channel and/or management protocol 1035 to configure the management agent 1010 to enforce the respective requirements of the management domains (1000, 1002, 1050) to which authority over apps and/or app data on the device 1040 has been delegated. Examples of management actions include, without limitation, installing, configuring, using, and/or removing apps, as in FIGS. 2 through 8 above.

Figure 11:
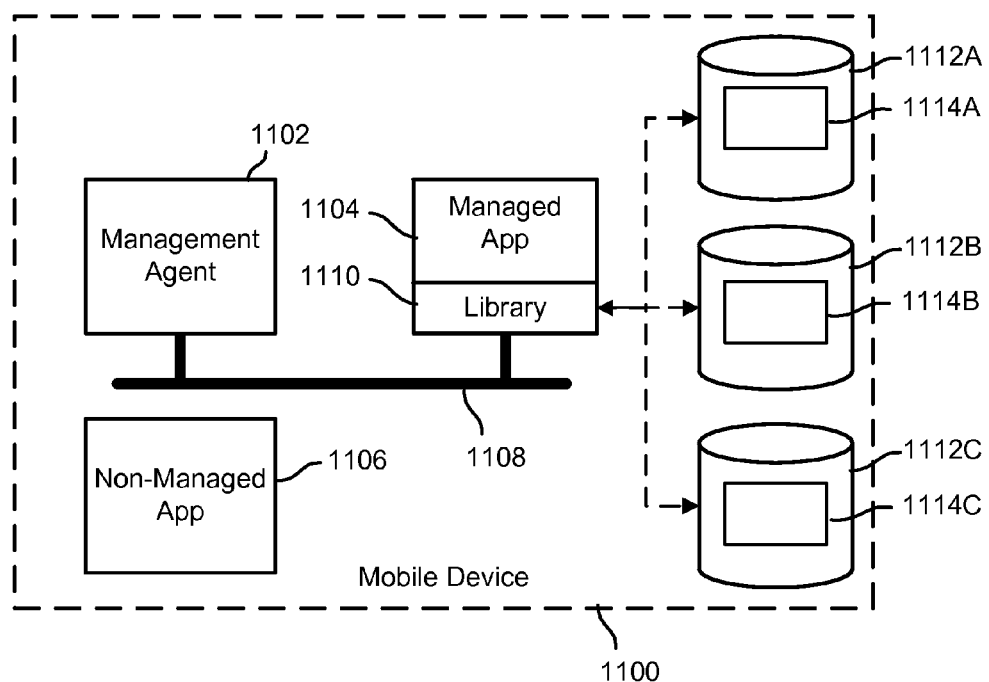
FIG. 11 is a block diagram illustrating an embodiment of a managed device configured to provide app and data management to multiple independent management entities.

FIG. 11 is a block diagram illustrating an embodiment of a managed device configured to provide app and data management to multiple independent management entities. In the example shown, device 1100 (e.g., smartphone, tablet, etc.) includes a management agent 1102 (e.g., a mobile device management (MDM) agent, a trusted management agent, trust client app), managed application(s) 1104, non-managed application(s) 1106, and/or other applications. The management agent 1102, managed applications 1104, and/or other components may be components of an MDM system.

In some embodiments, a library 1110 (e.g., multi-management entity support library) may be associated with a managed application 1104, e.g., to facilitate independent management of the application 1104 by one or more management entities or domains. The library 1110 may modify an application's code to behave differently than the corresponding unmodified version of the application behaves. For example, a managed application 1104 may be designed to be used in a single management context, for example, and may include no native and/or inherent support for use in different management contexts on the same device. In various embodiments, the library 1110 may configure (e.g., reconfigure) a managed application 1104 designed for use in a single context to support independently managed use in multiple contexts. The library 1110 may, for example, generate data sets 1112A, 1112B, 1112C (e.g., management context sandboxes) for each of one or more management contexts in which the app is to be used. For example, app data of managed application 1104 that is associated with a first management context, e.g., a first enterprise, may be allotted a first data set 1112A, a second management context may be allotted a second data set 1112B, a third user may be allotted a third data set 1112C, and so on. In various embodiments, each data set 1112A, 1112B, 1112C may include one or more application data objects 1114A, 1114B, 1114C, other data sets (e.g., data subsets), and/or other information. For example, a first management context of managed application 1104 may be associated with a data set 1112A including one or more application data objects 1114A. In various embodiments, a data set 1112A, 1112B, 1112C associated with a management context may include a sandbox (e.g., associated with the management domain/context, e.g., enterprise A, enterprise B, personal use).

In various embodiments, the library 1110 may configure the managed application 1104 to allow the management agent 1102 to perform actions on behalf of the managed application 1104 including invoking mobile operating system components, using mobile device resources, and/or accessing/storing application data. The library 1110 may mediate communication between managed application 1104 and the management agent 1102 and/or other managed application(s) 1104. The library 1110 may, in some embodiments, apply configuration changes, enforce policies, execute actions, and/or perform other operations within the managed application 1104.

According to various embodiments, the management agent 1102, managed applications 1104, and/or other elements are configured to transfer data in a trusted manner (e.g., securely) via a secure mobile application connection bus 1108 (e.g., secure inter-application connection bus, secure application command bus, secure application communication bus, etc.). Techniques to provide such a secure communication bus are described in U.S. Pat. No. 9,059,974, entitled "Secure Mobile App Connection Bus", issued Jun. 16, 2015, the entire disclosure of which is incorporated herein by reference for all purposes.

In some embodiments, data may be transferred in a trusted manner among applications authorized to have access to the secure mobile application connection bus 1108 by storing the data in an encrypted form in a data storage location (e.g., a paste board, shared keychain location, and/or other storage), which is accessible to the entities authorized to communicate via the bus 1108. In various embodiments, data may be transferred in a trusted manner from a first application (e.g., the management agent 1102) to a second application (e.g., a managed application 1104) authorized to have access to the secure mobile application connection bus 1108 by calling a uniform resource locator (URL) scheme associated with the second application including the encrypted data.

In various embodiments, application configuration information associated with a management context/domain may be enforced. Separate app data sets for each management context may be maintained, e.g., application data sets 1112A, 1112B, 1112C. The data associated with each respective management domain may be limited to being access by and/or in a user context associated with that domain. A separate connection bus instance 1108 may be used for apps associated with each respective management domain, and encryption and other techniques may be used to limit each management domain to accessing/managing only those apps over which the management domain has been delegated authority, and associated app data.

The management agent 1102 may provide application authentication, authorization, and/or configuration information to one or more managed applications 1104 (e.g., via the secure application connection bus 1108). In some embodiments, a library 1110 associated with a managed application 1104 may retrieve the application authentication, authorization, and/or configuration information from the secure bus 1108. The library 1110 may configure the managed application 1104 in such a way that a data set 1112A associated with a user is accessible within a context of the managed application 1104.

In various embodiments, one or more of management agent 1102, connection bus 1108, managed app(s) 1104, and library 1110 may be used, e.g., under control of a management broker such as broker 920 of FIG. 9 or broker 1020 of FIG. 10, to manage apps by and/or on behalf of multiple management domains, as disclosed herein. In particular, in various embodiments the architecture shown in one or more of FIGS. 9, 10, and 11 may be used to control managed app (e.g., 1104) behavior, as it relates to the storage of app data for separate management domains and/or otherwise, as disclosed herein.

In various embodiments, techniques disclosed herein may enable different management entities, e.g., different companies, to be delegated authority to manage apps, each within a defined management domain. Techniques disclosed herein may enable mobile apps and app data to be managed by multiple entities, including personal use. Each entity's data may be stored securely on the device, and apps may be shared between companies and/or used securely for both work and personal use.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing applications, comprising:
   receiving, from a management entity to which a scope of authority to manage applications with respect to a mobile device has been delegated, a set of one or more application management policies to be enforced with respect to the mobile device within the scope of authority delegated to the management entity; and
   enforcing, by a management agent on the mobile device, the one or more application management policies with respect to applications and application data that are within the scope of authority delegated to the management entity, wherein enforcing the one or more application management policies at least includes:
   receiving an indication to install an application;
   detecting that an instance of the application is already present on the mobile device;

in the event the instance of the application cannot be shared with the management entity, installing a separate instance of the application for use by the management entity; and in the event the instance of the application can be shared with the management entity, configuring the application to be shared by the management entity and a second management entity; and providing via a display device of the mobile device a display of applications installed on the mobile device, in which each application is represented by a corresponding application icon, the respective application icons of at least a subset of the applications including for each a graphic or other visual indication of one or more management domains to which authority to manage that application has been delegated.

2. The method of claim 1, further comprising receiving a definition of the management entity and the scope of authority.

3. The method of claim 1, wherein the management entity comprises a first management entity included in a plurality of management entities to which respective scopes of authority have been delegated with respect to the mobile device.

4. The method of claim 3, wherein enforcing the one or more application management policies further comprises resolving a conflict between a first application management requirement of the first management entity and a second application management requirement of the second management entity included in the plurality of management entities.

5. The method of claim 1, wherein the scope of authority includes an authority to install the application on the mobile device.

6. The method of claim 1, wherein the second management entity comprises an owner or other personal user of the device.

7. The method of claim 1, wherein configuring the application to be shared by the management entity and a second entity comprises configuring the application to store application data associated with the management entity separately from application data associated with the second management entity.

8. The method of claim 1, wherein the scope of authority includes an authority to remove the application from the mobile device; and further comprising receiving from the management entity an indication to remove the application; determining that the application remains in use by the second management entity; and removing or otherwise securing application data associated with the management entity without removing the application, based at least in part on the determination that the application remains in use by the second management entity.

9. A system, comprising:
a communication interface; and
a processor coupled to the communication interface and configured to:
receive, via the communication interface, from a management entity to which a scope of authority to manage applications with respect to a mobile device has been delegated, a set of one or more application management policies to be enforced with respect to the mobile device within the scope of authority delegated to the management entity; and
enforce, by a management agent on the mobile device, the one or more application management policies with respect to applications and application data that are within the scope of authority delegated to the management entity, wherein to enforce the one or more application management policies, the processor is further configured to:
receive an indication to install an application;
detect that an instance of the application is already present on the mobile device;
in the event the instance of the application cannot be shared with the management entity, install a separate instance of the application for use by the management entity; and
in the event the instance of the application can be shared with the management entity, configure the application to be shared by the management entity and a second management entity; and
provide via a display device of the mobile device a display of applications installed on the mobile device, in which each application is represented by a corresponding application icon, the respective application icons of at least a subset of the applications including for each a graphic or other visual indication of one or more management domains to which authority to manage that application has been delegated.

10. The system of claim 9, wherein the processor is further configured to receive a definition of the management entity and the scope of authority.

11. The system of claim 9, wherein the management entity comprises a first management entity included in a plurality of management entities to which respective scopes of authority have been delegated with respect to the mobile device.

12. The system of claim 11, wherein the processor is further configured to resolve a conflict between a first application management requirement of the first management entity and a second application management requirement of the second management entity included in the plurality of management entities.

13. The system of claim 9, wherein the scope of authority includes an authority to install the application on the mobile device.

14. The system of claim 9, wherein the second management entity comprises an owner or other personal user of the device.

15. The system of claim 9, wherein configuring the application to be shared by the management entity and a second management entity comprises configuring the application to store application data associated with the management entity separately from application data associated with the second management entity.

16. A computer program product to manage applications, the computer program product being embodied in a non-transitory computer readable medium and comprising computer instructions for:
receiving, from a management entity to which a scope of authority to manage applications with respect to a mobile device has been delegated, a set of one or more application management policies to be enforced with respect to the mobile device within the scope of authority delegated to the management entity; and
enforcing, by a management agent on the mobile device, the one or more application management policies with respect to applications and application data that are within the scope of authority delegated to the management entity, wherein enforcing the one or more application management policies at least includes:
receiving an indication to install an application;

detecting that an instance of the application is already present on the mobile device;

in the event the instance of the application cannot be shared with the management entity, installing a separate instance of the application for use by the management entity; and in the event the instance of the application can be shared with the management entity, configuring the application to be shared by the management entity and a second management entity; and providing via a display device of the mobile device a display of applications installed on the mobile device, in which each application is represented by a corresponding application icon, the respective application icons of at least a subset of the applications including for each a graphic or other visual indication of one or more management domains to which authority to manage that application has been delegated.

\* \* \* \* \*